US008274546B1

(12) United States Patent
Nicolet et al.

(10) Patent No.: US 8,274,546 B1
(45) Date of Patent: Sep. 25, 2012

(54) SYSTEM AND METHOD FOR IMPROVING AUDIO CAPTURE QUALITY IN A LIVING ROOM TYPE ENVIRONMENT

(75) Inventors: Richard Nicolet, Menlo Park, CA (US); Ashrith Deshpande, San Jose, CA (US)

(73) Assignee: Logitech Europe S.A., Morges (CH)

( * ) Notice: Subject to any disclaimer, the term of this patent is extended or adjusted under 35 U.S.C. 154(b) by 914 days.

(21) Appl. No.: 12/353,496

(22) Filed: Jan. 14, 2009

Related U.S. Application Data

(60) Provisional application No. 61/035,910, filed on Mar. 12, 2008.

(51) Int. Cl.
*H04N 7/14* (2006.01)

(52) U.S. Cl. .................. 348/14.04; 348/14.1; 348/14.09; 348/14.12; 348/E5.002; 348/E5.008; 379/88.13; 379/265.09

(58) Field of Classification Search ..... 348/14.04–14.14
See application file for complete search history.

(56) References Cited

U.S. PATENT DOCUMENTS

| 5,757,432 | A | * | 5/1998 | Dulong et al. | ............. | 348/384.1 |
| 7,676,142 | B1 | * | 3/2010 | Hung | ............................ | 386/233 |
| 7,679,637 | B1 | * | 3/2010 | Kohler | ....................... | 348/14.01 |
| 7,821,574 | B2 | * | 10/2010 | Black | ............................ | 348/515 |
| 2003/0229901 | A1 | * | 12/2003 | Amir et al. | ...................... | 725/95 |
| 2005/0087671 | A1 | | 4/2005 | Park | | |
| 2006/0132607 | A1 | * | 6/2006 | Kimber et al. | ............ | 348/207.1 |
| 2006/0238648 | A1 | * | 10/2006 | Wogsberg | ..................... | 348/441 |

FOREIGN PATENT DOCUMENTS

CN 2718649 Y 8/2005

* cited by examiner

*Primary Examiner* — Joseph J Nguyen
(74) *Attorney, Agent, or Firm* — Kilpatrick Townsend & Stockton LLP (57) ABSTRACT

The present invention is a system and method for improving the audio quality during a in a living-room type of environment having multimedia equipment. In accordance with an embodiment of the present invention, the audio signals emanating from various speakers are modified/altered, so as to capture audio signals with the highest signal to noise ratio. One situation where embodiments of the present invention are usable is in the context of a video/audio call. Since the positions of the microphone and speakers are generally fixed, in some embodiments, the speaker outputs are controlled/modified to provide an improved signal-to-noise ratio. In accordance with one embodiment, the audio emanating from the central speaker is subdued or eliminated to reduce significantly the problems that occur due to the audio from the center speaker being captured by the microphone, which is typically in close proximity to the center speaker. The audio may be provided to the speakers by various ways, such as HDMI, RCA, and so on.

14 Claims, 7 Drawing Sheets

Modify audio signal sent to the speaker closet to the audio capture device
401

SYSTEM AND METHOD FOR IMPROVING AUDIO CAPTURE QUALITY IN A LIVING ROOM TYPE ENVIRONMENT

CROSS-REFERENCES TO RELATED APPLICATIONS

This application claims the benefit of, and priority to, provisional application No. 61/035,910, entitled "System and Method for improving Audio Quality in Living Room Audio/Video Conference", filed on Mar. 12, 2008, and which is hereby incorporated by reference herein in its entirety.

BACKGROUND OF THE INVENTION

1. Field of the Invention

The present invention relates generally to improving the quality of audio signals being captured in the presence of audio signals being played back in a multi-speaker environment, and more specifically to improving audio quality in a video conferencing type conversation in a living room (or similar) setup.

2. Description of the Related Art

Video/audio conferencing is becoming more prevalent amongst users as a form of communication. Earlier on, such communication was limited, due to the need for specialized equipment for such communication. With the advent of webcams (cameras connected to and/or integrated within computers), such communication has become more widespread. However, such communication is still generally confined to the users' offices/studies (e.g., in the case of desktop computers) and/or to the display and sound limitations associated with equipment (e.g., in the case of laptop computers).

Users are keen to improve the experience of video/audio communications, and such video/audio communications are beginning to move to the living room (or other such places), which have state-of-the art multi-media systems. Such systems often include high-end displays (e.g., plasma or LCD TVs/screens), and equipment such as cable-boxes (for reception of TV programs), audio-video (AV) receivers, several speakers (e.g., in a 5.1 or a 7.1 configuration), set-top boxes and/or game consoles, etc. Such a move of video/audio conferencing into the living room type environment offers several advantages, including the use of higher-end equipment, better integration of video/audio conferencing into the users' lives (e.g., the user can be watching a TV program, receive a call and answer it without leaving the TV), etc. However, some issues unique to the use of video/audio conferencing in the living room environment have arisen.

One such issue relates to the quality of the audio experience in the living room. Often, audio is the most important aspect of a video/audio conference, with video enhancing/aiding the audio experience. Further, in some situations, the conference may be limited to audio alone. Thus unclear audio has a significant negative impact on the user experience. Some audio-related issues that arise in a typical living room type setup are described below.

Figure 1:
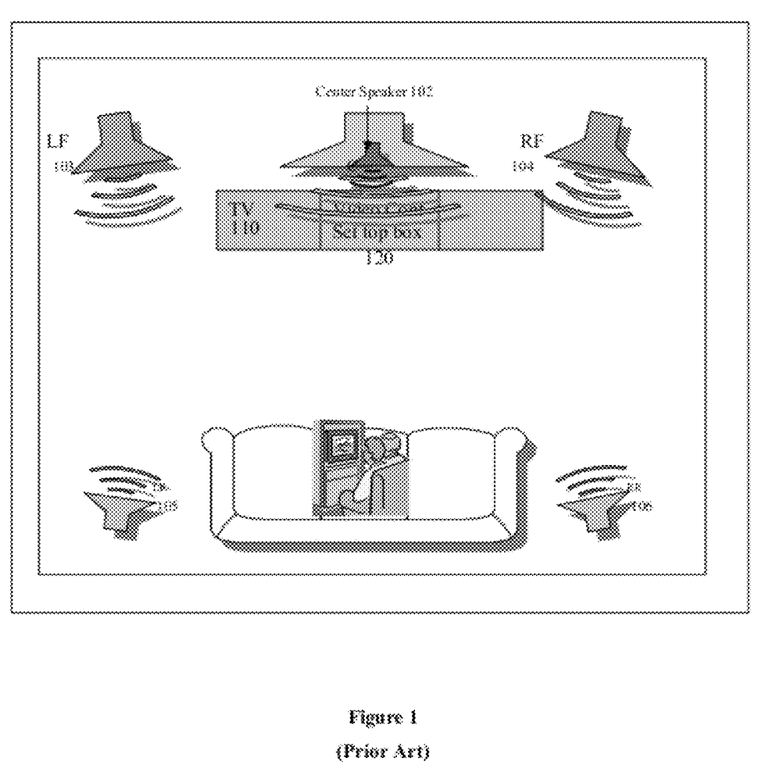
FIG. 1 shows a conventional living room setup in which an audio/video conference may take place.

A typical conventional living room setup is show in FIG. 1. Such a setup is primarily designed for watching TV, DVDs, etc. In such a living room type setup, a 5.1 (or a 7.1, or similar) surround sound system is often in place. A 5.1 surround sound system is discussed here for illustration purposes. Such a setup typically involves five speakers as illustrated in FIG. 1—one central speaker 102, two front speakers (left 103 and right 104) and two rear speakers (left 105 and right 106). The central speaker is typically mounted very close to (often immediately above or below) the TV/display 110. Additionally, the set-top box or similar device 120 used for purposes of video conferencing in the living room is also located very close to (often immediately above) the TV/display 110.

As can be seen from FIG. 1, the central speaker 102 is thus very close to the set-top box or similar device 120. For a video conferencing situation, this device 120 often includes (or is proximately connected to) a microphone and/or a webcam to capture audio/video information. Some gaming consoles, such as PlayStation 3 from Sony Corporation (Tokyo, Japan), and Xbox 360 from Microsoft Corporation (Redmond, Wash.), may also be usable, if webcams can be connected to them. Other examples of devices which can be used for video/audio conferencing include LifeSize® Express™ from LifeSize® (Austin, Tex.).

Due to the close proximity of central speaker 102 and the device 120 (which includes or is connected to a microphone), the audio emanating from central speaker 120 creates significant disturbance in the captured audio. This causes poor audio quality during a conversation. However, in most cases, the speakers and/or the microphone have relatively fixed locations and cannot be moved away from each other.

Thus there exists a need for a method and system for an easy and low-cost way to improve audio quality for a video/audio type communication in a living-room type setup. Further, there exists a need for improving dynamically and dramatically, and without user intervention, the audio performance of the existing systems where audio is being captured as well as played back, without physically moving an audio capture device or speakers.

BRIEF SUMMARY OF THE INVENTION

The present invention is a system and method for improving the audio quality during a video/audio conference call in a living-room type of environment.

In accordance with an embodiment of the present invention, the audio signals emanating from various speakers are modified/altered, so as to provide the user with the optimal audio experience in a video/audio call. Since the positions of the microphone and speakers are fixed in some embodiments of the present invention, the speaker outputs are controlled/modified in accordance with some embodiments of the present invention, so as to provide an improved signal-to-noise ratio, where the signal is the audio signals to be captured, and the noise is the playback audio from the speakers. Some of the techniques in accordance with embodiments of the present invention allow for essentially "virtually moving" the undesirable speaker for a good audio conference experience without user intervention.

In accordance with an embodiment of the invention, the audio emanating from the central speaker is subdued or eliminated completely, so as to reduce significantly the problems described above, that occur due to the audio from the center speaker being captured by the microphone, which is typically in close proximity to the center speaker.

In one embodiment, where the speakers are connected via High-Definition Multimedia Interface (HDMI) cables, the exact distribution of the sound to any speakers can be controlled. Every speaker has its own channel. Thus, in accordance with an embodiment of the present invention, a signal is created that plays audio to any specified speakers (e.g., the front or rear or both) with desired volume balance, and does not play any audio to other speakers (e.g., the center speaker).

In one embodiment, where the speakers are connected via RCA cables, surround audio systems receive left and right channels only. From these two inputs, a surround sound is created for audio systems ranging from 2.1 to 7.1. Such audio systems generate the center channel by using the left+right channels, along with some coefficient. In accordance with an embodiment of the present invention, the signal received by the center speaker is canceled by phase-shifting one or both channels.

In accordance with an embodiment of the present invention, an ongoing entertainment program is interrupted and/or paused in some way when a video/audio call is taking place, and is resumed when the video/audio call has ended.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures (or drawings) depict preferred embodiments of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

It is to be noted that several terms have been used in this discussion for conciseness and readability. However, their meaning should not be construed to limit the scope of the invention. For instance, some of the following discussion refers to webcams. However, it is to be noted that the present invention is not limited to such embodiments. Where applicable, this term includes various image capture devices such as, but not limited to, webcams, cameras, video cameras, Personal Digital Assistants (PDAs), cell phones, portable media players, and so on. Further, embodiments of the present invention are in no way limited to conferencing—the term "conferencing" is being used to describe any type of communication between users. Embodiments of the present invention can be used to facilitate set up and use of communication between users using various applications (e.g., email applications, instant messaging applications, etc.). Additionally, embodiments of the present invention are not limited to video, and may involve exchange of any type of multi-media communication, including, but not limited to audio by itself, audio accompanying video, audio accompanying still pictures, audio accompanying slide show presentations, etc. Moreover, it is to be noted that although the ensuing discussion is framed in the context of an audio/video communication, embodiments of the present invention can be used in several other contexts. Embodiments of the present invention can be used in any situation where an audio signal is being captured, and an audio signal is also being played back on multiple speakers located at significant distances from each other. In any such situation, embodiments of the present invention server to enhance the quality of the captured audio signal. Furthermore, embodiments of the present invention are not limited to use in the living room. The term "living room" is used to conveniently describe any environment which includes a setup with multiple speakers, one or more of which are in proximity of a microphone.

Figure 2:
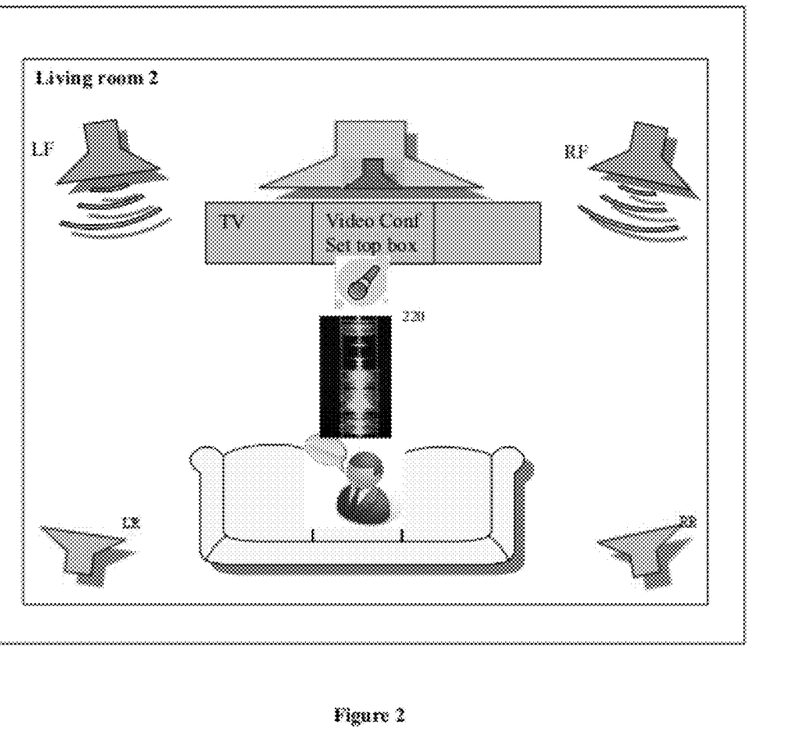
FIG. 2 shows a living room setup using a system in accordance with an embodiment of the present invention.

FIG. 2 is an illustration of a living room setup using a system in accordance with an embodiment of the present invention. A user is making a video conference with the set top box 220 placed on top of the TV, 110 next to the center 102 speaker. In this embodiment, only the left front (LF) 103 and right front (RF) 104 speakers are playing the audio being received from the far end. This technique reduces a lot the audio interference from the other speakers compared to FIG. 1.

As mentioned above, FIG. 2 shows a configuration where the front left 103 and front right 104 speakers are playing audio received from the other end of the conversation. It is to be noted that this is just one example. In other embodiments, different speakers play audio. For instance, in one embodiment, only the surround left rear 105 and right rear 106 play audio instead.

The manipulation of audio signals to various speakers to create an optimal conferencing environment can be implemented in various ways. Several available webcams communicate with a host (e.g., computer, set-top box etc.) via a USB cable, which currently provides a mono-channel. In many situations, the set top box 220 that decodes the mono channel coming from the far end is rebuilding a fake 5.1 surround audio signal. In accordance with embodiments of the present invention, this fake 5.1 surround audio signal is provided to only specific speakers (e.g., only for the left and right front speakers). All the other speakers do not receive any audio signal. This way, the interference created by the audio coming from the far end is significantly limited. The audio performance of the existing systems can be improved dramatically and dynamically from the set top box, without user intervention. More details regarding this are provided later in the discussion.

Figure 3A:
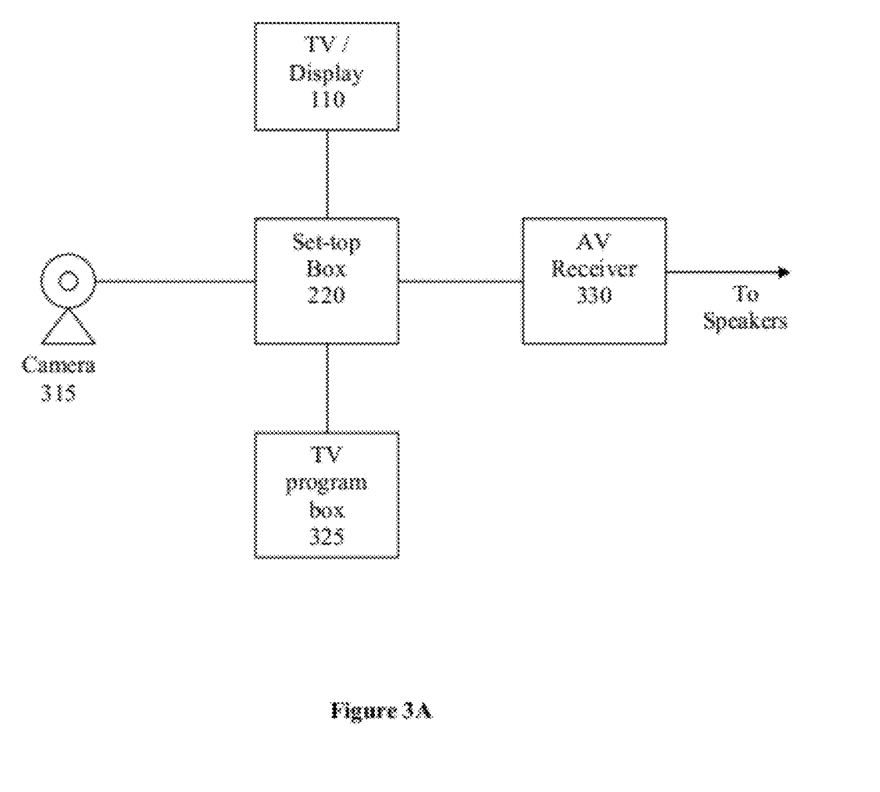
FIG. 3A is a block diagram of a system in accordance with an embodiment of the present invention.

FIG. 3A is a block diagram of a system in accordance with an embodiment of the present invention. A camera 315, a set-top box 220, a display 110, a TV program box 325, and an Audio/Video (AV) receiver 330 are shown. The speakers 102-106 to which the AV receiver 330 provides audio signals are not shown in FIG. 3A.

In FIG. 3A, the camera 315 can be any type of image-capturing device such as, but not limited to, webcams (e.g., QuickCam Pro from Logitech, Inc. (Fremont, Calif.)), cameras, video cameras, Personal Digital Assistants (PDAs), cell phones, portable media players, and so on. It is to be noted that several such image-capturing devices 315 also capture audio as well. It is to be noted that in one embodiment, a simple audio-capture device (e.g., a microphone) may be used, rather than a camera 315. One or both users may have an only audio conversation in such a case.

The set-top box 220 is a device which performs the processing necessary to perform the video/audio conference in accordance with embodiments of the present invention. The video conference takes place, in some embodiments, using a network (not shown). The network can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's Members, employees, or others with authorization. A LAN may also be a network such as, for example, Netware™ from Novell Corporation (Provo, Utah) or Windows NT from Microsoft Corporation (Redmond, Wash.). The network may also include commercially available subscription-based services such as, for example, AOL from America Online, Inc. (Dulles, Va.) or MSN from Microsoft Corporation (Redmond, Wash.). The network may also be a home network, an Ethernet based network, a network based on the public switched telephone network, a network based on the Internet, or any other communication network. Any of the connections in the network may be wired or wireless.

One or more users at the other end of the network may have a set-up similar to the set-up shown in the various figures for the user at the first end of the network. In some embodiments, the set-top box 220 runs an application used for the video conference, such as an instant messaging (IM) program. Examples of IM programs include ICQ from ICQ, Inc., America OnLine Instant Messenger (AIM) from America Online, Inc. (Dulles, Va.), MSN® Messenger from Microsoft Corporation (Redmond, Wash.), Yahoo!® Instant Messenger from Yahoo! Inc. (Sunnyvale, Calif.), and Skype from Skype Technologies, S.A. (Luxemborg).

The set-top box 220 may be connected to the image-capturing device 315, or may be consolidated with it, so that the set-top box 220 and the image-capturing device 315 are a single device. In either case, the set-top box processes the audio and/or video captured by the image-capturing device 315, and transmits it to the user at the other end of the video conference. Further, the set-top box 220 receives video and/or audio transmitted by the other user over the network (not shown).

The TV program box 325 can be any cable-box from companies such as Comcast Corporation (Philadelphia, Pa.). The TV program box 325 can also be any other similar device such as a DVR (Digital Video Recorder) from companies such as TiVo, Inc. (Alvino, Calif.), Dish Network Corporation (Englewood, Colo.) etc. In some situations, the set-top box 220 and the TV program box 325 are integrated into a single component. In some embodiments, there is no TV program box 325. In one embodiment, a simple antenna (or similar device) is responsible for providing TV programming to the TV 110.

The AV receiver 330 can be any AV receiver available. It is to be noted that there are many possible components in a multi-media system which are not shown here, such as, but not limited to DVD players, CD players, gaming consoles, and so on. Further, many of the components shown here may not be included in some systems. The system shown here merely provides one possible example of such a set-up.

In the embodiment shown in FIG. 3A, the image-capturing device 315 is connected to the set-top box 220. The camera 315 is connected, in one embodiment, to the set-top box 220 by a USB cable. It is to be noted that the image-capturing device 315 may be a part of the set-top box 220, rather than being a separate physical entity.

In the embodiment shown in FIG. 3A, the set-top box 220 is connected to each of the display 110, the TV program box 325, and the AV receiver 330. In one embodiment, some or all of these connections are via HDMI cables. The AV receiver 330 is connected to the speakers to provide them with the audio signal.

Figure 3B:
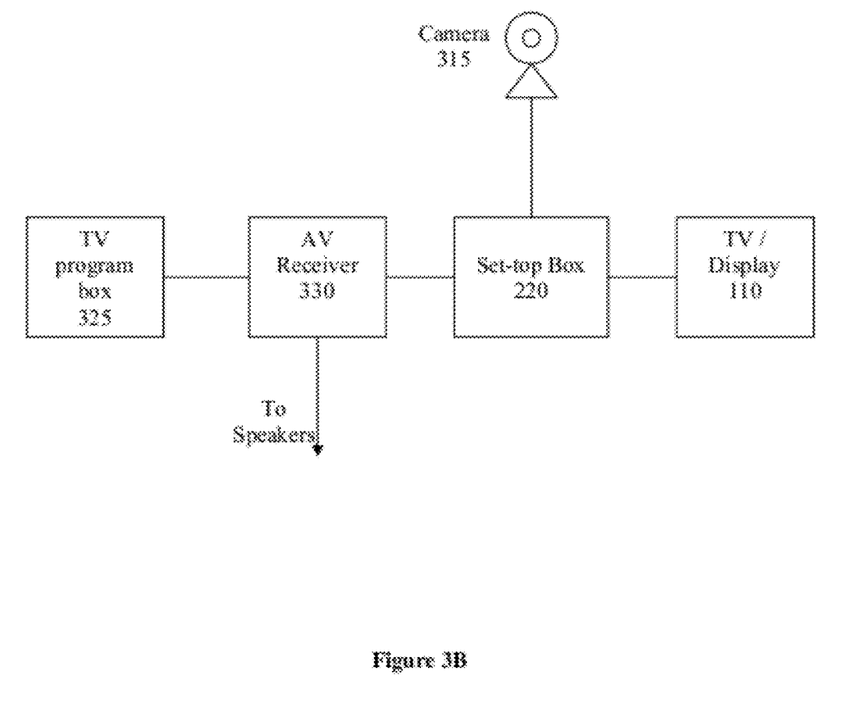
FIG. 3B is a block diagram of another system in accordance with an embodiment of the present invention.

FIG. 3B is another block diagram of a system in accordance with an embodiment of the present invention. The components shown in the system are similar to those in FIG. 3A, but the inter-connections between them are different. It can be seen that in the embodiment shown in FIG. 3B, set-top box 220 is connected between the AV receiver 330 and the display 110. The TV program box 325 is connected to the AV receiver 330, and the AV receiver 330 again provides the audio signal to the speakers.

It is to be noted in some embodiments, that regardless of the specific interconnections between the various components of the system, it is important that the audio from an entertainment program (e.g., TV programming being provided by the TV program box 325, a DVD player, etc.) does not interfere with the audio being provided by the conference program. In accordance with an embodiment of the present invention, an ongoing entertainment program may continue to play, while an overlay (e.g. a picture-in-picture or any other type of overlay) is displayed for the ongoing video/audio conference. In some embodiments, the audio portion of the ongoing entertainment program is muted when a conversation is ongoing, and the audio portion of the entertainment program can once again be heard when the conversation is completed. This might be the case when a program cannot be paused (e.g., when live TV is being watched). In one embodiment, in cases where the entertainment program can be paused (e.g., the entertainment program is played using a TV program box including DVR type capabilities, a DVD player, etc,), the entertainment program is automatically paused when a conversation starts, and resumes when the conversation is over. In another embodiment, the conference call audio and/or video is combined with the program audio/video (e.g., in a picture-in-picture form, etc.).

Figure 4A:
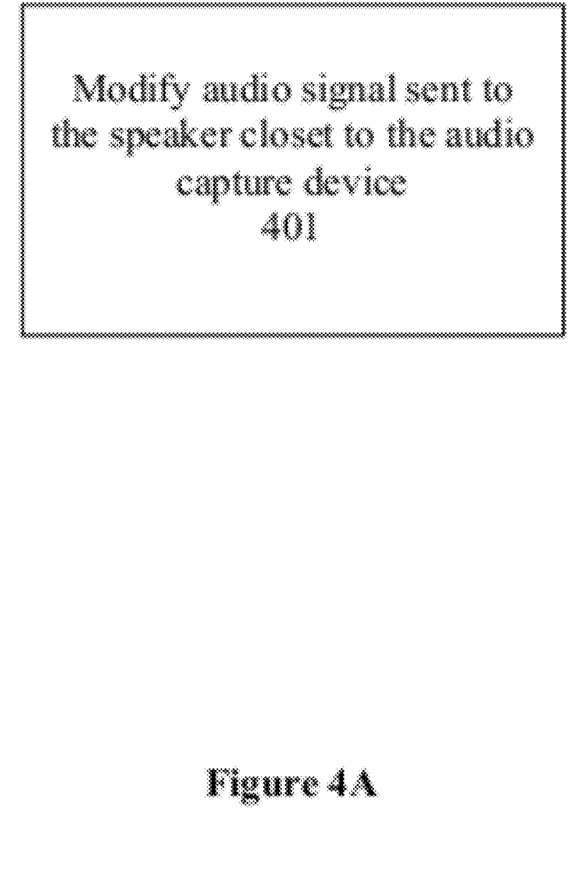
FIG. 4A is a flowchart showing the steps implemented by a system in accordance with one embodiment of the present invention.

FIG. 4A is a flowchart showing the steps implemented by a system in accordance with one embodiment of the present invention. In one embodiment, the system includes multiple speakers far away from each other, and an audio-capture device close to one of the speakers (e.g., the central speaker). In such a system, the audio signal being sent to the speaker most proximate to the audio capture device is modified (step 401). Some ways in which the signal is modified are discussed elsewhere in this application.

Figure 4B:
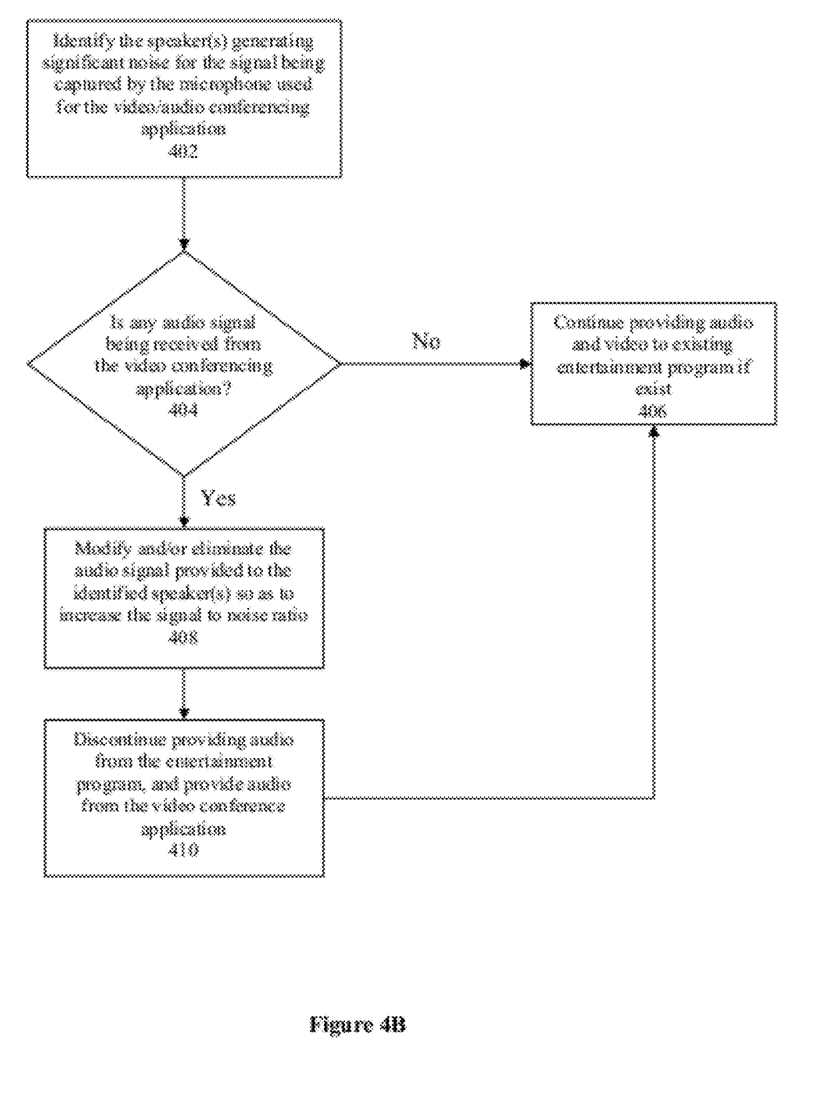
FIG. 4B is a flowchart showing the steps implemented by an entertainment system in accordance with one embodiment of the present invention.

4B is a flowchart showing the steps implemented by an entertainment system in accordance with one embodiment of the present invention. In one embodiment, the speaker or speakers that create a significant interference with the microphone capturing audio for the video/audio conferencing application are first identified (step 402). In one embodiment, this is done by playing a tone from each speaker individually, in an otherwise quiet room, and monitoring the feedback to the microphone. Often, as explained earlier, in a typical 5.1 or 7.1 speaker configuration, this is the center speaker. However, this may not necessarily be the case. Depending on the placement of various components in the room, audio from other speakers (e.g. one or both front speakers) may be creating significant interference with the audio signal captured by the microphone, instead of, or in addition to, the central speaker. In one embodiment, this step of identification (step 402) is not taken. Rather, an assumption is made that certain speakers e.g., the central speaker) will create the most interference, and steps are then taken to minimize/eliminate that interference.

As discussed above, in one embodiment, a video/audio application can work along-side an entertainment program (e.g., a TV program, a DVD program, etc.). In such a situation, when a video/audio call is initiated, either by the first user or by a user at the far end, the audio and/or video portion of the entertainment program may be paused/muted. This has been discussed above.

In one embodiment, it is determined (step 404) whether an audio signal is being received from a video/audio conferencing application. If no such audio signal is being received, the audio from an entertainment program (if any) continues to be transmitted (step 404) to the AV receiver 330 for sending to the speakers 102-106. If applicable, the video for the entertainment program also continues to be displayed to the user on display 110.

If it is determined that an audio signal is being received from a video/audio conferencing application, then audio signal being sent to the speaker(s) identified in step 402, or to one or more default speakers (e.g., a central speaker) is modified/eliminated so as to reduce interference with the microphone, and to enhance the signal to noise ratio of the audio being captured for transmission to the far end. This is described in further detail below.

In some embodiments, the audio signal from the entertainment program (if ongoing) is discontinued (step 410) and the modified audio signal from the video conferencing application is sent to the speakers. In one embodiment, any video signal from the entertainment program is also discontinued (e.g., in a situation where a video conference is taking place between the users). In one embodiment, the audio and/or video signal from the entertainment program is paused while the conversation between the users is ongoing. Such embodiments are only feasible when pausing the entertainment program is possible in the user's setup—for instance, because the user has a Digital Video Recorder (DVR) or similar (e.g. Tivo) equipment, or when such functionality is incorporated into the set-top box 220.

It is to be noted that in some embodiments, one or more of steps 402, 403 and 410 are optional.

As mentioned above, the position of the microphone is fixed in some embodiments of the present invention, and the speaker outputs are controlled/modified in accordance with some embodiments of the present invention, so as to provide an improved signal-to-noise ratio. The following provides examples of some ways in which the audio is not provided to some specific speakers (e.g., central speaker, front speakers, etc.). It is to be noted that embodiments of the present invention are in no way limited to these examples.

Two types of connections frequently used for audio connections in a living room type setup are High-Definition Multimedia Interface (HDMI) and RCA. Both solutions are different. As examples, each of these is considered below in the context of canceling the center channel (which is closest to the microphone as discussed above, and which therefore often poses the biggest challenge in a video/audio conferencing system).

HDMI connection: HDMI provides a digital audio signal. In this world of digital audio signals, the exact distribution of the sound to any speakers can be controlled. Every speaker has its own channel. Thus, in accordance with HDMI specifications, a signal can be created that can play audio to any specified speakers (e.g., the front or rear or both) with desired volume balance, and not play any audio to other speakers (e.g., the center speaker).

RCA connection: In this analog world, surround audio systems receive left and right channels only. From those 2 inputs, a surround sound is created for audio systems ranging from 2.1 to 7.1. Such audio systems generate the center channel by using the left+right channels, along with some coefficient.

Tables 1-3 below provide example of matrices used by various Dolby systems to generate surround audio.

TABLE 1

| Dolby Surround | Left | Right | Center | Surround |
|---|---|---|---|---|
| Left Total | 1 | 0 | $\frac{\sqrt{2}}{2}$ | $j\frac{\sqrt{2}}{2}$ |
| Right Total | 0 | 1 | $\frac{\sqrt{2}}{2}$ | $k\frac{\sqrt{2}}{2}$ |

$j = +90°$ phase-shift, $k = -90°$ phase-shift

TABLE 2

| Dolby Pro Logic | Left | Right | Center | Rear Left | Rear Right |
|---|---|---|---|---|---|
| Left Total | 1 | 0 | $\frac{\sqrt{2}}{2}$ | $j\frac{\sqrt{2}}{2}$ | $j\frac{\sqrt{2}}{2}$ |
| Right Total | 0 | 1 | $\frac{\sqrt{2}}{2}$ | $k\frac{\sqrt{2}}{2}$ | $k\frac{\sqrt{2}}{2}$ |

$j = +90°$ phase-shift, $k = -90°$ phase-shift

TABLE 3

| Dolby Pro Logic II | Left | Right | Center | Rear Left | Rear Right |
|---|---|---|---|---|---|
| Left Total | 1 | 0 | $\frac{\sqrt{2}}{2}$ | $j\frac{\sqrt{2}}{2}$ | $j\frac{\sqrt{2}}{2}$ |
| Right Total | 0 | 1 | $\frac{\sqrt{2}}{2}$ | $k\frac{\sqrt{2}}{2}$ | $k\frac{\sqrt{2}}{2}$ |

$j = +90°$ phase-shift, $k = -90°$ phase-shift

For each of the above tables, the Center channel=square(2)/2*Left channels+square(2)/2*Right channels. For a mono channel, conventionally the left channel is the same as the right channel, so this means 0.707*Left Total+ 0.707*Right total=1.41 Left and Right.

Since the center channel is, in many systems (as shown in the above tables), some coefficient times the left channel added to the same coefficient times the right channel, in one embodiment, the center channel is canceled by making the phase of the left channel opposite to the phase of the right channel. (Left=−Right, or phase of left is 180 degrees from the phase of right). For instance, the phases of the left and right channels may be −90/+90, or 0+/−180, and so on.

In one embodiment, an Instant Messaging (IM) application is used to conduct a video/audio conference. Examples of IM applications include ICQ from ICQ, Inc., America OnLine Instant Messenger (AIM) from America Online, Inc. (Dulles, Va.), MSN® Messenger from Microsoft Corporation (Redmond, Wash.), Yahoo!® Instant Messenger from Yahoo! Inc. (Sunnyvale, Calif.), and Skype from Skype Technologies, S.A. (Luxemborg). IM applications typically provide mono-channel audio, which is used to create both the left and right channel. (That is, the left channel is the same as the right channel).

As mentioned above, in many legacy systems, the center channel is created by adding the left signal and the right signal, and using an appropriate coefficient. If the left signal=−right signal, when added together they cancel each other and no signal is present on the center channel. Thus one possible implementation is to cancel the center channel by generating a left and right audio signal shifted 180 degree from each other from the mono channel coming out of an instant messenger.

As mentioned above, several other implementations are possible in accordance with embodiments of the present invention. Further, the audio may be directed to any specific speakers, and/or may be directed away from any specific speakers to minimize feedback interference. Some of the advantages provided by the invention include the ability to suppress any particular speakers dynamically without user intervention, while still using legacy speakers, receivers, TVs, etc. In accordance with various embodiments of the present invention, the implementation can be in software, firmware, hardware, or a combination of any of these. In one embodiment, the implementation is in the device 220.

Figure 5:
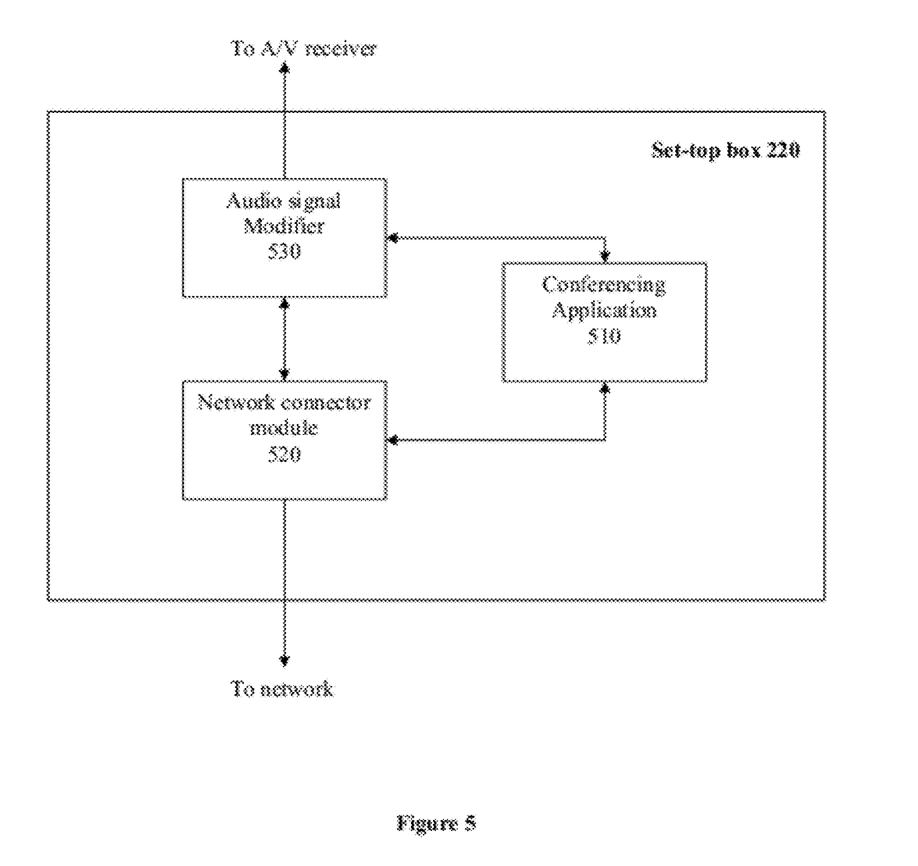
FIG. 5 is a block diagram of a set-top box in accordance with an embodiment of the present invention.

A set-top box 220 in accordance with an embodiment of the present invention is shown in FIG. 5. In one embodiment, the set-top box 220 has several components, some of which are shown in FIG. 5. A conferencing application 530 is an application used to communicate with a remotely located user (or users). Examples of conferencing applications, such as Instant Messaging (IM) applications have been provided above. The conferencing application communicates with the remotely located user over a network, which has also been discussed above. The set-top box 220, in one embodiment, includes a network communicator 520, via which the conferencing application connects to the network. In one embodiment, an audio signal modifier module 530 receives the incoming audio signal from the conferencing application 510, and modifies the audio signal before sending it out to the multi-media receiver 330, which in turns, sends it out to the speakers. In one embodiment, it is this audio-signal modifier 530 which modifies the audio signal in various ways, some of which have been discussed above. Several other components (not shown), such as a processor, an acoustic echo canceller (AEC) etc., may be include in the set-top box 220.

While particular embodiments and applications of the present invention have been illustrated and described, it is to be understood that the invention is not limited to the precise construction and components disclosed herein. For example, as mentioned above, a conversation between a first user and a remotely located user is not a necessary aspect of the present invention—rather, the embodiments of the present invention are useful in any scenario where audio is being captured, as well as being played from multiple speakers. One example of such a scenario which does not involve audio conferencing is that of a language learning tutorial where a coach "speaks" and the user speaks with him, and the user's speech is recorded. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A method for improving audio quality in a conversation between a first user and a remotely located second user, wherein a multi-media system is used for the conversation, the multimedia system comprising a plurality of speakers, the method comprising:

capturing an audio signal from the first user using an audio capturing device;

transmitting the captured audio signal over a network to the second user;

receiving an audio signal from the second user;

modifying the received audio signal, wherein the step of modifying the received audio signal results in a higher signal to noise ratio for the captured audio signal being transmitted, and comprises eliminating the audio signal sent to one of the plurality of speakers, wherein the step of eliminating the audio signal sent to one of the plurality of speakers comprises making a phase of a first portion of the audio signal opposite of a phase of a second portion of the audio signal; and transmitting the modified received audio signal to the plurality of speakers.

2. The method of claim 1, wherein the one of the plurality of speakers is a centrally located one of the plurality of speakers.

3. The method of claim 1, further comprising:
identifying the one of the plurality of speakers.

4. The method of claim 3, wherein the step of identification comprises:
identifying the one of the plurality of speakers located proximate to the audio capturing device.

5. The method of claim 1, wherein the step of modifying the received audio signal comprises:
specifying a subset of the plurality of speakers to which the audio signal is to be transmitted.

6. The method of claim 1, further comprising:
interrupting an ongoing entertainment program in response to a determination that the conversation is ongoing.

7. The method of claim 6, further comprising:
re-commencing the ongoing entertainment program in response to a determination that the conversation has ended.

8. An audio control system comprising:
an audio capturing device;
a network communication device;
a processor configured to:
capture an audio signal from a first user using the audio capturing device;
transmit the captured audio signal via the network communication device to a second user;
receive an audio signal from the second user;
modify the received audio signal; and
transmit the modified received audio signal to a plurality of speakers,
wherein modifying the received audio signal results in a higher signal to noise ratio for the captured audio signal being transmitted, and comprises eliminating the audio signal sent to one of the plurality of speakers, and
wherein the step of eliminating the audio signal sent to one of the plurality of speakers comprises making a phase of a first portion of the audio signal opposite of a phase of a second portion of the audio signal.

9. The device of claim 8, wherein the one of the plurality of speakers is a centrally located one of the plurality of speakers.

10. The device of claim 8, wherein the processor is further configured to identify the one of the plurality of speakers.

11. The device of claim 10, wherein the step of identification comprises:
identifying the one of the plurality of speakers located proximate to the audio capturing device.

12. The device of claim 8, wherein the step of modifying the received audio signal comprises:

specifying a subset of the plurality of speakers to which the audio signal is to be transmitted.

13. The device of claim 8, wherein the processor is further configured to interrupt an ongoing entertainment program in response to a determination that a conversation is ongoing between the first user and the second user.

14. The device of claim 13, wherein the processor is further configured to re-commence the ongoing entertainment program in response to a determination that the conversation has ended.

* * * * *